(12) United States Patent
Murphy et al.

(10) Patent No.: US 7,543,835 B2
(45) Date of Patent: Jun. 9, 2009

(54) BICYCLE FORK WITH IMPROVED STEER TUBE AND CROWN

(75) Inventors: Roger Paul Murphy, Waterloo, WI (US); Chad Manuell, Waterloo, WI (US)

(73) Assignee: Trek Bicycle Corporation, Waterloo, WI (US)

(*) Notice: Subject to any disclaimer, the term of this patent is extended or adjusted under 35 U.S.C. 154(b) by 58 days.

(21) Appl. No.: 11/744,110

(22) Filed: May 3, 2007

(65) Prior Publication Data

US 2007/0257466 A1 Nov. 8, 2007

Related U.S. Application Data

(60) Provisional application No. 60/746,289, filed on May 3, 2006.

(51) Int. Cl.
*B62K 1/00* (2006.01)

(52) U.S. Cl. ............... 280/276; 280/279; 280/275

(58) Field of Classification Search ........... 280/276, 280/275, 279
See application file for complete search history.

(56) References Cited

U.S. PATENT DOCUMENTS

| | | | |
|---|---|---|---|
| 4,828,285 A | 5/1989 | Foret et al. | |
| 5,016,895 A * | 5/1991 | Hollingsworth et al. | 280/280 |
| 5,039,470 A | 8/1991 | Brezin et al. | |
| 5,076,601 A | 12/1991 | Duplessis | |
| 5,078,417 A | 1/1992 | Mouritsen | |
| 5,080,385 A | 1/1992 | Duplessis | |
| 5,181,732 A * | 1/1993 | Bezin et al. | 280/279 |
| 5,215,322 A | 6/1993 | Enders | |
| 5,364,115 A | 11/1994 | Klein et al. | |
| 5,609,349 A | 3/1997 | Buckmiller et al. | |
| 5,692,764 A * | 12/1997 | Klein et al. | 280/279 |
| 5,762,352 A | 6/1998 | Lee | |
| 5,944,932 A | 8/1999 | Klein et al. | |
| 6,109,638 A | 8/2000 | Colegrove | |
| 6,655,707 B2 * | 12/2003 | Buckmiller et al. | 280/279 |
| 6,955,372 B1 | 10/2005 | Fritschen | |
| 2004/0061302 A1 | 4/2004 | Parlee | |
| 2005/0012299 A1 * | 1/2005 | Schuman et al. | 280/288.3 |

FOREIGN PATENT DOCUMENTS

JP 01148682 A 6/1989

* cited by examiner

*Primary Examiner*—Paul N Dickson
*Assistant Examiner*—Tashiana Adams
(74) *Attorney, Agent, or Firm*—David C. Brezina; Ladas & Parry LLP

(57) ABSTRACT

A fiber reinforced plastic bicycle fork uses a reinforced crown steer tube junction extending the steer tube through a tapered socket to the brake bolt such that the metal steer tube coacts with the fiber reinforced plastic fork to preserve structural integrity in the event of application of high stress to the fork.

14 Claims, 3 Drawing Sheets

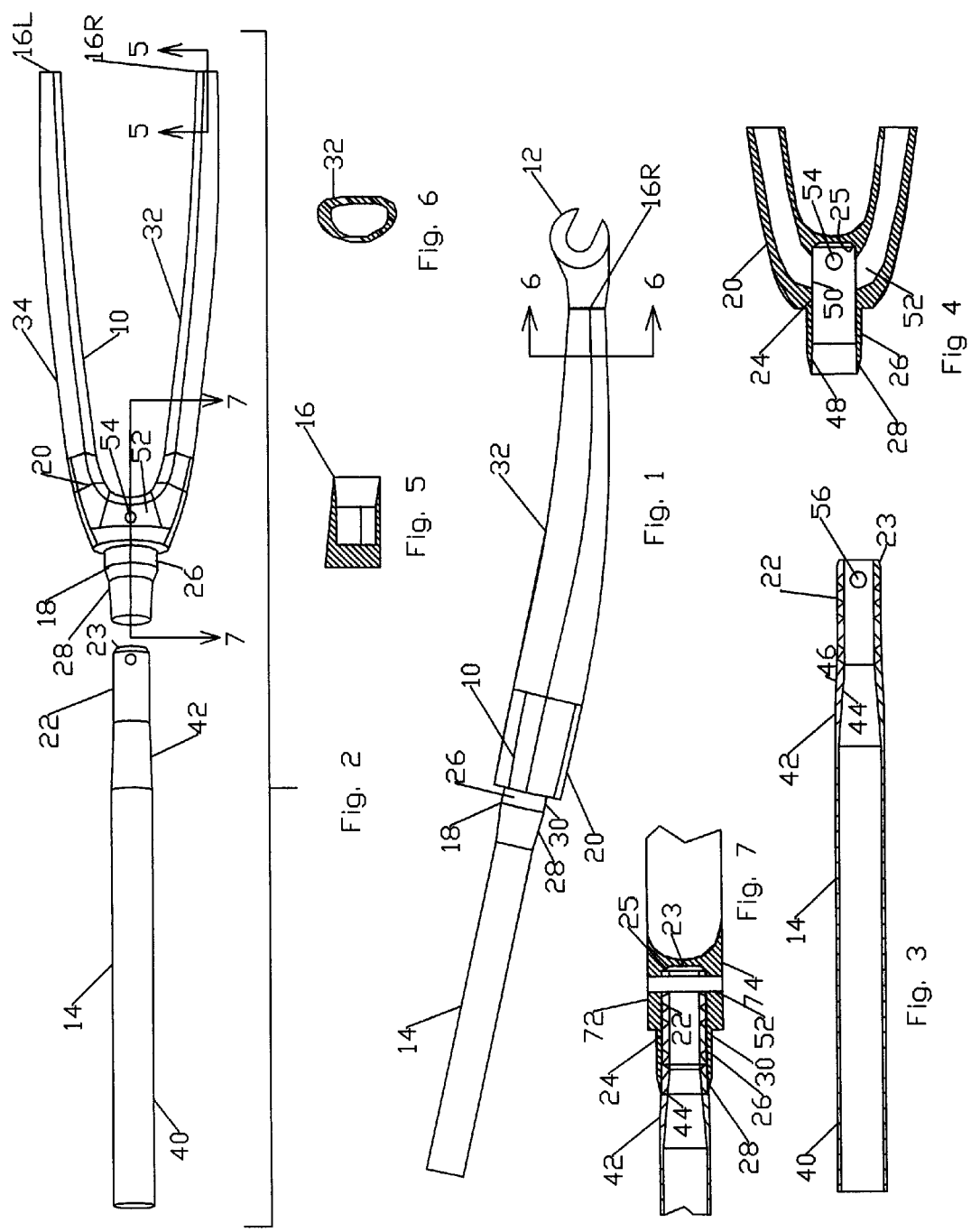

BICYCLE FORK WITH IMPROVED STEER TUBE AND CROWN

BACKGROUND OF THE INVENTION

1. Field of the Invention

The invention is a bicycle fork with improved steer tube and crown for a bicycle with improved steer tube and crown strength and durability.

2. Description of Related Art

Generally, prior art bicycle fork solutions have included the metal fork with a strong-crown, and a steer tube on the top, with tubular fork blades ending in dropouts. Fiber reinforced plastic composite forks have generally used the strong-crown and blade model, or have molded two halves, with the blades extending into the steer tube area, but being subdivided in halves, that were bonded together.

Foret U.S. Pat. No. 4,828,285, Hollingsworth U.S. Pat. No. 5,016,895 and Buckmiller U.S. Pat. No. 5,609,349 are representative of the high-strength crown approach, although Foret shows the blade halves as an alternative embodiment.

Klein U.S. Pat. Nos. 5,944,932 and 5,692,764 and Bezin U.S. Pat. Nos. 5,039,470 and 5,181,732 are representative of the two blade halves approach. In each approach to a composite fork, separate metal dropouts are used for wheel attachment, primarily because of wear considerations.

An example of a threadless fork and handlebar stem combination is shown in Edwards, U.S. Pat. No. 5,865,069.

Application Publication No. US-2005-0012299-A1, sharing a common assignee herewith, teaches a solution to strengthening the steer tube crown intersection using continuous carbon reinforcing fibers extending from the fork blades, through the crown and into the steer tube. In the fork in this published application, the aluminum steer tube slips over the carbon steer tube and stops short of the crown. The choice of aluminum provides advantages over a fork made entirely of fiber reinforced plastic in that the handlebar stem can be more readily fastened to the steer tube which can be particularly advantageous in situation such as a workshop by a mechanic unskilled in fastening techniques for more exotic materials. The material properties of a metal or other ductile material in the steer tube, in combination with high modulus fiber reinforcement in the fork body yield improvements under certain conditions.

Colegrove, et al, U.S. Pat. No. 6,924,021 describes a complex-shaped carbon fiber structural member and its method of manufacture, using a combination of prepreg sheets, laminations, unidirectional fiber ropes and fiber bundles, which methods can be used in forming the fork of the present invention.

Notable in composite bicycle frame patents is the fact that the disclosures in the leading patents focus on the frame itself, to the exclusion of the fork. Thus, Nelson U.S. Pat. No. 6,270,104 B1, Duplessis U.S. Pat. No. 5,076,601, Trimble U.S. Pat. No. 5,158,733, Brezina U.S. Pat. No. 4,493,749 and Derujinsky U.S. Pat. No. 4,900,048 do not show forks, while Trimble U.S. Pat. Nos. 4,923,203 and 4,982,975 show forks, but only as part of the environment.

The aforementioned patents and application are incorporated by reference as if fully set forth herein.

SUMMARY OF INVENTION

The invention teaches the use of a steer tube that is preferably metallic and is preferably tapered and mates with and is bonded to a carbon reinforced plastic portion comprising a steer tube stub and fork crown. Preferably the brake bolt passes through the fork body and the aluminum steer tube. Other configurations which place a ductile material in areas of potentially high load, such as with a first portion of a steer tube being of ductile material and a second portion being of carbon fiber reinforced plastic, may be adaptable consistent with the teachings herein.

This fork provides improvement in strength and toughness by providing a tougher crown, crown race seat and bearing receivable portion in the lower portion of the steer tube, near the intersection of steer tube and crown. In this invention, even in a significant impact, the ductile material of the steer tube deforms but holds the fork together. The brake bolt also acts as redundant reinforcement.

The fiber reinforced plastic portion of the fork can utilize optimum compaction, low void molding of a bicycle fork. A lay-up schedule for the laminations in combination with specific structural shapes enables a strong, light fork while utilizing the advantages of different material properties of the pieces for reinforcement, particularly at the fork crown. The fork crown portion is formed by bladder molding using a layup to provide walls that are sufficiently thick as to make this portion substantially solid. Other reinforcing arrangements such as internal walls can also be utilized as alternatives.

A bonded steer tube enables the use of a multiplicity of materials such as the aluminum. Beveling or tapering the steer tube receiving portion of the fiber reinforced plastic crown and also beveling or tapering the steer tube enables a gradual transition zone with wall thickness at the top of carbon crown proximate the bearing race, such that impact damage can be absorbed with the fork bending, but not breaking.

The steer tube of the invention is particularly advantageously adapted to use threadless fork arrangements in which the handlebar stem clamps to the exterior of the steer tube under preload from an adjusting cap, thereby locking a top bearing race in place.

The invention here uses a method which forms a bicycle fork having a complete shell using main laminations which contain continuous fibers extending from the tip to the steer tube. The entire carbon portion is bladder molded and is hollow. The walls that support the steer tube are molded thick enough so that when machined to receive the steer tube, there is enough material left to support the steer tube entirely front to back. There is a thin portion on the sides of the steer tube that are left unsupported inside the crown since the entire carbon structure is molded hollow. A preferably aluminum steer tube extension is bonded to a steer tube portion of the shell, although other metals or ductile materials could be used. The crown bearing race is a part of the one-piece lower of the fork and is machined to the desired diameter.

The dropouts are preferably secondarily bonded and have a male plug on the dropout that plugs into the female socket on the fork blade. The dropouts may be co-molded, may have sockets, or both.

The aluminum steer tube extension receives a star-fangled nut of a typical threadless headset. The use of aluminum, other metal, or other material which can suffer limited wall deformation of that portion of the steer tube which is captured within a bicycle handlebar stem, spacers or frame head tube, is advantageous in a threadless stem configuration because it suffers less from strength reduction as a result of the embedding of the star-fangled nut teeth in the interior wall, when compared to a fiber reinforced plastic composite material. The use of high modulus composite material extending continuously up onto or around the steer tube adds to overall fork strength

BRIEF DESCRIPTION OF DRAWINGS

FIG. 1 is a side elevational view of the bicycle fork.

FIG. 2 is a top plan view of the fiber reinforced plastic portion and steer tube of the bicycle fork.

FIG. 3 is a sectional view of the steer tube of the bicycle fork.

FIG. 4 is a sectional view of the crown portion of the bicycle fork.

FIG. 5 is a sectional view of the bicycle fork dropout receiving tip of the bicycle fork taken at line 5-5 of FIG. 2.

FIG. 6 is a sectional view of the bicycle fork blade of the bicycle fork taken at line 6-6 of FIG. 1.

FIG. 7 is a sectional view of the bicycle fork crown and steer tube taken at line 7-7 of FIG. 2.

DESCRIPTION OF EMBODIMENTS

Figure 8:
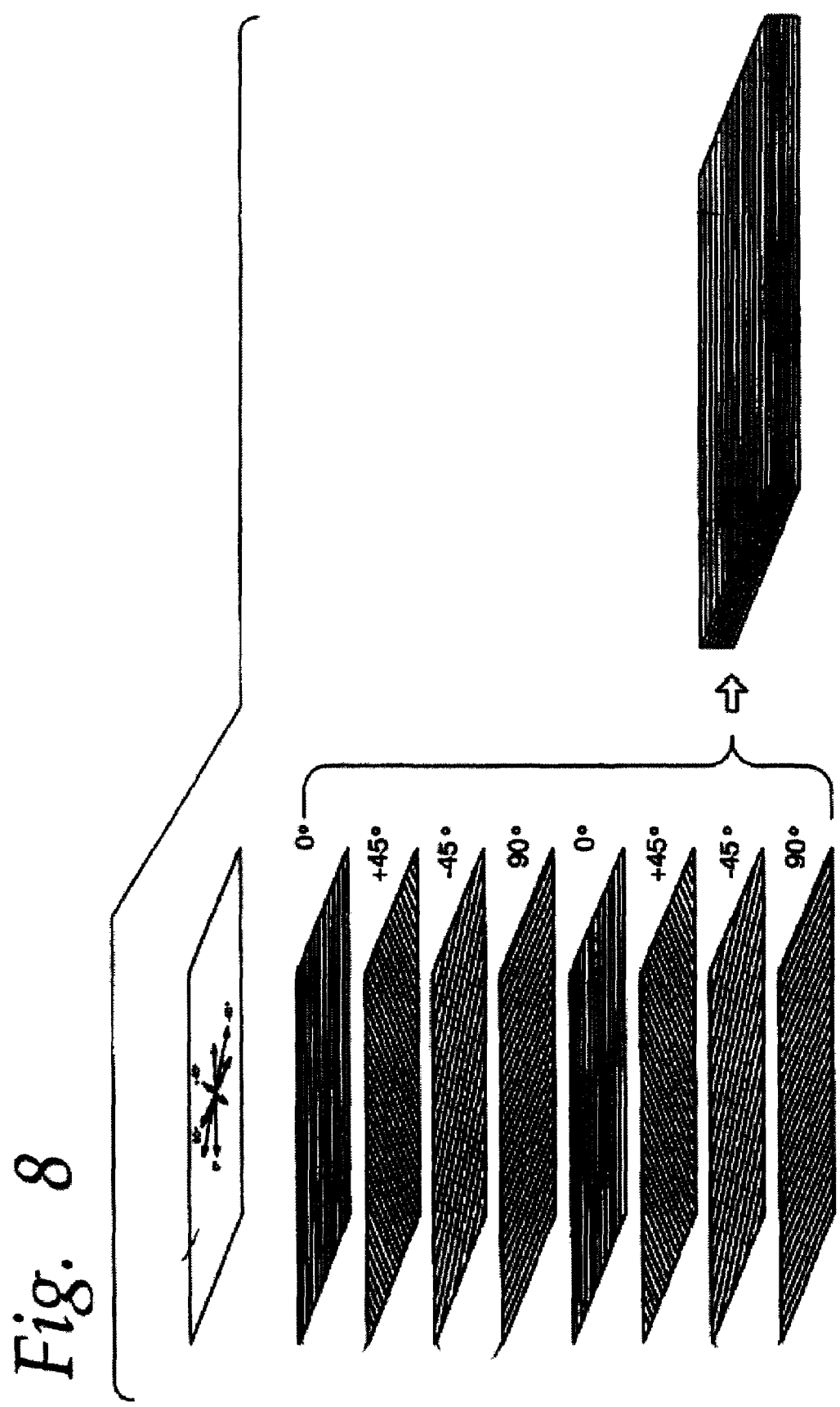
FIG. 8 is a schematic showing a lamination layup.

A bicycle fork 10 is formed of fiber reinforced plastic having bonded dropouts 12 and a steer tube 14. The fiber reinforced plastic portion of the fork extends from the tips 16L and 16R to steer tube base 18 and includes crown portion 20. Tube 14 is formed with a narrowed, but thickened interior wall portion 22 which mates with a correspondingly beveled socket 24 of crown portion 20. Beveled edges 23, 25 provide a gradual transition zone for the fiber reinforced plastic to metal joint thereby providing superior durability and predictability in strength properties at the crown race and bearing seat.

While aluminum has advantages for tube 14, other materials could be used such as steel or titanium. Other hybrid metal/composite structures could be used. Indeed, tube 14 could be formed so as to limit the ductile material, such as aluminum, to the area proximate the crown, and be formed in a composite manner with fiber reinforced plastic extending upward from the ductile portion to the location at which the handlebar would be attached. The form and arrangement of the exterior surface of wall portion 22 and interior surface of socket 24 are consistent with the principles of lug-and-tube construction described in the Nelson U.S. Pat. No. 6,270,104 B1, and Colegrove, et al, U.S. Pat. No. 6,924,021 patents referenced above.

Base 18 is also beveled, providing a thicker wall proximate crown race 26 and a tapered transitional end 28 to better distribute loads from the bicycle headset to the fork crown 20. Crown 20 is formed by precision molding or machining to have a bearing seat 30 located so as to surround the region defined by crown race wall 26 and portion 22, so that there is a double thickness of different materials at this high load location. Some machining of crown race wall 26 and bearing seat 30 is permitted by the strength of the fiber reinforced plastic crown 20. Precision molding may obviate the need for machining.

Depending from crown 20 are fork blades 32, 34. Blades 32, 34 end in tips 16L and 16R to which dropout 12 and its corresponding opposing dropout are attached.

Steer tube 14 is formed with varying wall thickness and wall diameter progressively from handlebar stem receiving portion 40, having a fairly large diameter and fairly thin wall, through transition zone 42 at which an internal taper 44 thickens the wall, while the external taper 46 reduces the diameter, terminating in end 22.

Mating surfaces in socket 24 of base 18 are formed with a conical transition 48 generally inside end 28 that leads to a cylindrical wall 50 that passes through crown race wall 26 and extends into the body of crown 20.

Additionally, crown 20 has a brake bolt portion 52 having an aperture 54 for receiving a bicycle brake bolt. Aperture 54 aligns with a corresponding aperture 56 in steer tube end 22.

Tube 14 is bonded in socket 24 with the various surfaces described above being adhesively connected. This could be through a co-molding process or could be a post-molding secondary bond. This configuration coacts with base 18 so that crown race wall 26 is of a dimension standard in bicycle frames, enabling a new fork in accordance to the invention to be adapted to easily replace existing forks. Thus, thickened end 22 and crown race wall 26 provide a very strong, impact resistant structure at the location where high loads are concentrated in the case of a collision between a bicycle wheel and an obstruction. Additionally, a mechanical connection is provided by the brake bolt penetrating coaxial apertures 54, 56.

Figure 9:
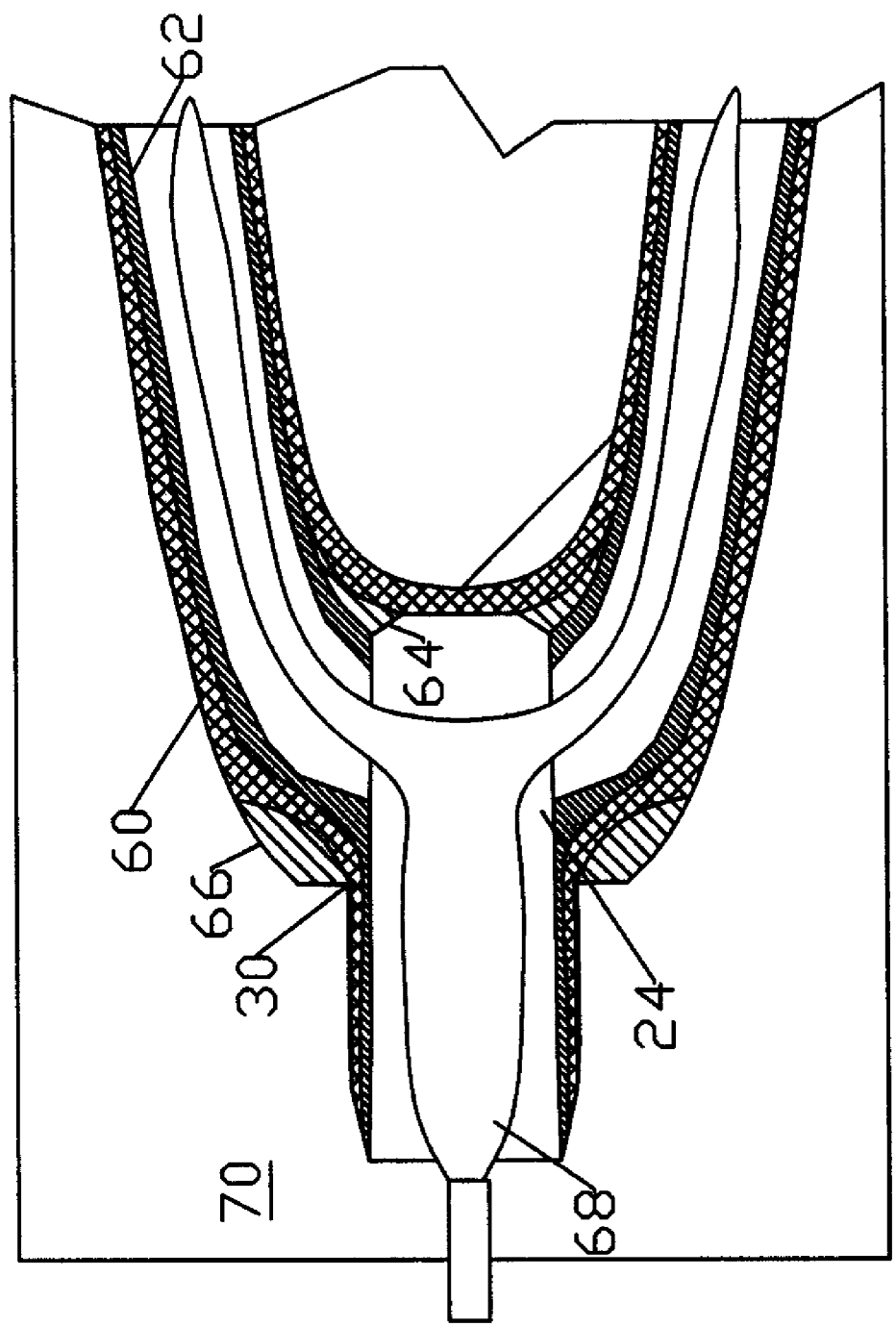
FIG. 9 is a sectional view showing the layup of a portion of the fork in a portion of a mold.

In order to best take advantages of the material properties within the structures of a fork retrofittable to standard bicycles and fitting standard wheels and brakes, a combination of the methods of Nelson U.S. Pat. No. 6,270,104 B1, and Colegrove, et al, U.S. Pat. No. 6,924,021 can be adapted. FIG. 8 shows schematically the orientation of different unidirectional prepreg carbon-epoxy layers into a quasi-isotropic lamination. A plurality of these laminations, 60, 62 can be used as shown in FIG. 9, in combination with a fiber bundle concentration region 64, 66 and this uncured wrapped around an inflatable bladder, 68 fitted in a female mold 70. Regions 64, 66 can be advantageously located to better orient laminations 60, 62, or to provide material to precisely form bearing seat 30.

A comparison of the section of FIG. 4, taken on a transverse line, looking in a longitudinal direction, and FIG. 7 taken on a longitudinal line, looking in a transverse direction, relative to the direction of travel of a bicycle illustrate the structure of socket 24. Socket 24 is formed so that front and rear walls 72, 74 contact, and are bonded to, portion 22 of steer tube 14. End 23 fits in and is bonded to socket end 25. This provides high strength resisting longitudinal loading. FIG. 4 shows the advantages of the hollow formation of crown 20. Lateral loads affect forks with attached wheels much differently than frontal loads. In FIG. 4, the side extending portions of crown 20, which merge into blades 32, 34 are not required to contact portion 22. The contact and bonding of different materials and the shape of socket 24 with thickened fork walls provide a high strength, lightweight and tough fork having both high modulus and ductility proximate the crown.

What is claimed is:

1. A bicycle fork formed of fiber reinforced plastic and having dropouts at a fork tip and a steer tube comprising:
   a fiber reinforced plastic portion of the fork extending from said tip to a steer tube base;
   said fiber reinforced plastic portion including a crown portion;
   said steer tube is formed with a narrowed, but thickened interior wall portion ending in a first beveled edge;
   a socket being formed in said crown portion, said socket terminating in a second beveled edge;
   said wall portion and first beveled edge mate with said socket and said second beveled edge;
   said interior wall portion being bonded to a front wall and rear wall of said crown portion;
   a crown race and bearing seat being located in the region of the steer tube wall portion and crown front and rear wall bonding proximate said crown race and a tapered transitional end tapers to a handlebar stem receiving portion of said steer tube;

said fiber reinforced plastic being formed with high modulus fibers and said steer tube being formed of a material having ductility higher than said fibers.

2. The fork of claim 1, said steer tube being formed of one of aluminum, steel or titanium.

3. The fork of claim 2, said fiber reinforcement being formed substantially of carbon.

4. The fork of claim 3, said steer tube is formed with varying wall thickness and wall diameter, said thickness increasing and wall diameter decreasing progressively from said handlebar stem receiving portion to said first beveled end, having a fairly large diameter and fairly thin wall, through a transition zone at which an internal taper thickens the wall, while the external taper reduces the diameter, through an end portion, terminating in said first beveled end.

5. The fork of claim 4, mating surfaces being formed in said socket with a conical transition generally inside said steer tube end portion that leads to a cylindrical wall that penetrates crown race wall and extends into the body of said crown.

6. The fork of claim 5, said crown has a brake bolt portion having a first aperture for receiving a bicycle brake bolt, said first aperture aligning with a second aperture in said steer tube end portion.

7. The fork of claim 6, said steer tube is bonded in said socket adhesively by one of a co-molding process or a post-molding secondary bond.

8. The fork of claim 7, said fiber reinforced plastic portion being formed of differentially orientated unidirectional prepreg carbon-epoxy layers into a quasi-isotropic lamination;

said lamination combined with a fiber bundle concentration region and placed uncured and wrapped around an inflatable bladder, in a female mold;

said bladder is inflated and said prepreg laminations cured;

said mold is opened after said fork is fully formed and cured and said fork is removed.

9. A bicycle fork crown formed of fiber reinforced plastic, said crown having a top wall, bottom wall, front wall, and back wall comprising: a projecting socket wall extending upward from the top wall of said crown and a reinforcing tube extending through and contained within said socket; said reinforcing tube being formed with a tube wall portion ending in a first edge; said first edge projecting into said crown and extending through said socket to a second edge formed in an upper portion of said bottom wall so that said first edge mates with said second edge; said tube wall portion being attached to said bottom wall by one of bonding or co-molding a crown race and bearing seat being located in the region of the tube wall portion and crown front and rear wall bonding; said fiber reinforced plastic being formed with high modulus fibers and said steer tube being formed of a material having ductility higher than said fibers.

10. The fork crown of claim 9, said tube being formed of one of aluminum, steel, titanium or high ductility composite.

11. The fork crown of claim 9, said tube is a steer tube formed with varying wall thickness and wall diameter, said thickness increasing and wall diameter decreasing progressively from a handlebar stem receiving portion to said first end through a transition zone at which an internal taper thickens the wall, while the external taper reduces the diameter, through an end portion said first end terminating as a beveled end.

12. The fork crown of claim 9, further comprising a brake bolt portion having a first aperture for receiving a bicycle brake bolt, said first aperture aligning with a second aperture in said tube end portion.

13. The fork crown of claim 9, said tube is bonded in said socket adhesively by one of a co-molding process or a post-molding secondary bond.

14. The fork crown of claim 9, said fiber reinforced plastic portion being formed of differentially orientated unidirectional prepreg carbon-epoxy layers into a quasi-isotropic lamination;

said lamination combined with a fiber bundle concentration region and placed uncured and wrapped around an inflatable bladder, in a female mold;

said bladder is inflated and said prepreg laminations cured;

said mold is opened after said fork is fully formed and cured and said fork is removed.

* * * * *